(12) United States Patent
Cabeza Gozalo et al.

(10) Patent No.: US 12,241,638 B2
(45) Date of Patent: Mar. 4, 2025

(54) DOMESTIC APPLIANCE DEVICE

(71) Applicant: BSH Hausgeräte GmbH, Munich (DE)

(72) Inventors: Tomas Cabeza Gozalo, Saragossa (ES); Javier Lasobras Bernad, Ejea de los Caballeros (ES); Sergio Llorente Gil, Saragossa (ES); Jorge Mir Bel, Saragossa (ES); Julio Rivera Peman, Cuarte de Huerva (ES); Maria Victoria Rodrigo Tobajas, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 18/285,895

(22) PCT Filed: Apr. 6, 2022

(86) PCT No.: PCT/EP2022/059071
§ 371 (c)(1),
(2) Date: Oct. 6, 2023

(87) PCT Pub. No.: WO2022/223294
PCT Pub. Date: Oct. 27, 2022

(65) Prior Publication Data
US 2024/0191880 A1    Jun. 13, 2024

(30) Foreign Application Priority Data
Apr. 22, 2021  (EP) .................... 21382350

(51) Int. Cl.
*G06F 3/01* (2006.01)
*F24C 7/08* (2006.01)
(Continued)

(52) U.S. Cl.
CPC .............. *F24C 7/083* (2013.01); *F24C 7/086* (2013.01); *H05B 6/062* (2013.01); *G06F 3/04886* (2013.01)

(58) Field of Classification Search
CPC ........................................................ G06F 3/14
See application file for complete search history.

(56) References Cited

U.S. PATENT DOCUMENTS 11,474,657 B2 * 10/2022 Liao ..................... G06F 3/0481
2010/0182136 A1 * 7/2010 Pryor ..................... G06F 3/017
340/425.5
(Continued)

FOREIGN PATENT DOCUMENTS

CN 104848267 A 8/2015
DE 102009000652 A1 8/2010
(Continued)

OTHER PUBLICATIONS

International Search Report PCT/EP2022/059071 dated Jun. 28, 2022.

*Primary Examiner* — Joseph R Haley
(74) *Attorney, Agent, or Firm* — Michael E. Tschupp; Andre Pallapies; Brandon G. Braun (57) ABSTRACT

A household appliance device includes a household appliance operating unit including a communication unit designed to communicate with an external multimedia unit such that an operating command is transmittable from the household appliance operating unit to the multimedia unit via the communication unit.

8 Claims, 3 Drawing Sheets

(51) Int. Cl.
*H05B 6/06* (2006.01)
*G06F 3/04886* (2022.01)

(56) References Cited

U.S. PATENT DOCUMENTS

| | | | |
|---|---|---|---|
| 2015/0038103 A1* | 2/2015 | Park | H04L 63/08 |
| | | | 455/420 |
| 2015/0042453 A1 | 2/2015 | Beifuss | |
| 2015/0167987 A1 | 6/2015 | Peterson | |
| 2019/0213037 A1* | 7/2019 | Kim | G06F 3/0486 |

FOREIGN PATENT DOCUMENTS

| | | |
|---|---|---|
| DE | 102017124826 A1 | 4/2019 |
| DE | 102018131031 A1 | 6/2020 |
| EP | 2362335 A1 | 8/2011 |

\* cited by examiner

DOMESTIC APPLIANCE DEVICE

CROSS-REFERENCES TO RELATED APPLICATIONS

This application is the U.S. National Stage of International Application No. PCT/EP2022/059071, filed Apr. 6, 2022, which designated the United States and has been published as International Publication No. WO 2022/223294 A1 and which claims the priority of European Patent Application, Ser. No. 21/382,350.3, filed Apr. 22, 2021, pursuant to 35 U.S.C. 119 (a)-(d).

The contents of International Application No. PCT/EP2022/059071 and European Patent Application, Ser. No. 21/382,350.3 are incorporated herein by reference in their entireties as if fully set forth herein.

BACKGROUND OF THE INVENTION

The invention relates to a household appliance device, a household appliance, a household appliance system, and a method for operating a household appliance device.

A hob device having an operating unit for operating a hob is already known from the prior art.

BRIEF SUMMARY OF THE INVENTION

It is the object of the invention in particular to provide a generic device with improved characteristics in terms of convenience, in particular for an operator. The object is achieved according to the invention by the features of claims 1, 13, 14 and 15, while advantageous embodiments and developments of the invention will emerge from the subclaims.

Advantages of the Invention

The invention is based on a household appliance device, in particular a hob device, with a household appliance operating unit.

It is proposed that the household appliance operating unit comprises a communication unit, which is provided to communicate with at least one external multimedia unit, at least one operating command being able to be transmitted from the household appliance operating unit to the multimedia unit by means of the communication unit.

Such an embodiment provides a household appliance device with a particularly high level of convenience, in particular for an operator. Because a household appliance operating unit is provided to transmit an operating command to an external multimedia unit by means of communication, the multimedia unit can be operated and/or controlled by means of the household appliance operating unit. The operator can therefore operate the multimedia unit without directly performing an activity at the multimedia unit, in particular while operating a household appliance, for example during a cooking operation. This preferably prevents soiling of the multimedia unit, for example by greasy and/or dirty fingers of the operator, thereby advantageously protecting the multimedia unit. In particular the household appliance operating unit can function in the manner of a wireless mouse and/or touchpad mouse for operation of the multimedia unit. The multimedia unit can also be operated by means of a voice-controlled function of the household appliance operating unit. This allows convenient and/or fast and/or efficient activation and/or operation of the multimedia unit, without direct contact with at least a screen of the multimedia unit.

The household appliance device could be for example a cooking appliance device, for example a microwave device and/or a grill device and/or a steam appliance device and/or an oven device and/or preferably the hob device. Alternatively and/or additionally the household appliance device could also be a household refrigeration appliance device, in particular a refrigerator and/or freezer device, and/or a household cleaning appliance device, for example a dishwasher device and/or a washing machine device and/or a tumble dryer device. When fitted in position the household appliance device forms a sub-assembly of a household appliance, in particular a household refrigeration appliance and/or a household cleaning appliance, for example a dishwasher and/or a washing machine and/or a tumble dryer, and/or a cooking appliance, for example a microwave and/or a grill and/or a steam appliance and/or an oven and/or preferably a hob. In particular the hob device configured as an induction hob device could be a sub-assembly of an induction hob, possibly also comprising accessory units for the hob, for example a sensor unit for measuring a temperature of a cooking utensil and/or food being cooked. It would also be conceivable for the household appliance device to comprise the entire household appliance, in particular the entire hob.

The household appliance device and/or the household appliance is/are part of a household appliance system. The household appliance system is preferably configured as a hob system. The hob system, in particular the induction hob system, is provided for use and/or arrangement in a kitchen. The hob system could feature a plurality of units and/or devices, which can be used to treat and/or process food. For example the hob system could be part of a kitchen device and in particular also comprise at least one extraction unit and/or at least the sensor unit, in particular a temperature sensor, which could be provided for positioning in the cooking utensil and/or in the food being cooked, for example in the form of a skewer.

The household appliance operating unit is provided to operate the household appliance device and/or the household appliance and/or the household appliance system. The household appliance operating unit could comprise for example at least one control unit and/or at least one inverter and/or at least one operator interface. The control unit could comprise at least one computation unit and, in addition to the computation unit, at least one storage unit, in which at least one control and/or regulation and/or monitoring program is stored, being provided for execution by the computation unit. The household appliance operating unit, in particular the control unit, advantageously activates a power supply unit of the household appliance device electronically, this advantageously supplying at least power for operating the household appliance device and/or the household appliance and/or the household appliance system, in particular power at least for a heating device of the household appliance device and/or the household appliance, so that at least operation of the household appliance device and/or the household appliance and/or the household appliance system can be provided in at least one operating state.

The household appliance device and/or the household appliance and/or the household appliance system advantageously comprises a housing unit, in particular a hob housing unit, and/or a household appliance electronics system, in particular a hob electronics system. In particular the household appliance operating unit is provided to operate the household appliance electronics system. It would also be conceivable for the household appliance device to comprise a placement plate, in particular a hob plate and/or kitchen worktop, which could possibly be part of the housing unit. In the case of the placement plate configured as a hob plate, the hob plate could be part of the hob and in particular delimit the heating device for an operator, particular in an upward direction. The placement plate is advantageously an in particular plate-like unit, which is provided to hold at least one small household appliance and/or the cooking utensil and/or at least the food to be cooked. The placement plate could for example be made at least partially and preferably at least largely of wood and/or a mineral, in particular granite and/or glass, and/or ceramic and/or marble and/or stone, in particular natural stone, and/or Neolith and/or Dekton and/or laminate and/or plastic and/or a composite material. The expression "largely" here means for example at least 55%, advantageously at least 65%, preferably at least 75%, particularly preferably at least 85% and particularly advantageously maximum 95% by volume and/or mass. It would be conceivable for the placement plate to be engraved or printed, in particular to mark out at least one heating unit, but the placement plate is preferably not engraved and/or printed. Alternatively or additionally the hob plate could be part of the placement plate.

In a further embodiment the entire placement plate could be configured as a hob plate, in particular a glass ceramic plate. In one preferred embodiment the entire placement plate is configured as a kitchen worktop and in particular also as a hob plate, the placement plate having a thickness of in particular maximum 30 mm, preferably maximum 20 mm and particularly preferably maximum 12 mm. In particular in contrast to the hob plate the placement plate configured as a kitchen worktop is also preferably provided to offer a food preparation region, in particular allowing the performing of cutting and/or mixing and/or crushing and/or peeling of food. A "placement plate" here is part of a kitchen and in particular delimits and/or closes off a part of an assembly of kitchen cabinets and/or further household appliances in an upward direction. In the present application position descriptions, such as "below" or "above" relate to a mounted state of the placement plate, unless specifically stated otherwise.

The household appliance operating unit is preferably at least partially integrated in the placement plate and/or arranged below and/or above the placement plate. In at least the operating state the communication unit is provided for data transfer and/or data communication with an external unit, preferably the external multimedia unit. In particular the communication unit comprises a transmitter unit and/or a receiver unit for transmitting and/or receiving data and/or signals. The communication unit could comprise for example at least one data line, in particular a cable, or particularly preferably be configured as a wireless communication unit. The wireless communication unit could transmit a signal and/or data, in particular between the household appliance operating unit and the multimedia unit, by means of microwaves and/or infrared radiation, for example using Bluetooth and/or Wi-Fi and/or NFC and/or RFID and/or ZigBee and/or another suitable standard.

In the operating state the communication unit transmits at least the operating command from the household appliance operating unit to the multimedia unit. The communication unit could also transmit at least the operating command and/or a further operating command from the multimedia unit to the household appliance operating unit. The multimedia unit is part of the household appliance system, the multimedia unit preferably featuring a further communication unit for communicating with the communication unit. In particular the further communication unit comprises a further transmitter unit and/or a further receiver unit for transmitting and/or receiving data and/or signals. The further communication unit is advantageously configured to communicate with the communication unit. The communication unit and the further communication unit are provided reciprocally to transmit and/or to receive and/or to process at least the signal and/or data, in particular the operating command, in the operating state.

The multimedia unit could be for example a terminal, preferably a mobile terminal, the multimedia unit being provided in particular for entertainment purposes for the user. The terminal could be for example a computer, in particular a desktop computer, and/or a laptop and/or a convertible. Alternatively the multimedia unit could be a mobile terminal. The mobile terminal is advantageously a mobile telephone and/or tablet and/or phablet and/or personal digital assistant (PDA) for example. In particular the multimedia unit is a unit which is provided to supply information and/or content from digital media. The digital media, in particular electronically encoded media, could be for example at least one animation and/or audio and/or photographs and/or graphics and/or text and/or video.

Operation and/or control of the multimedia unit and/or the household appliance operating unit is preferably possible by means of the operating command. With a method for operating the household appliance device the operating command is transmitted from the household appliance operating unit to the multimedia unit, in particular such that the multimedia unit is operated and/or controlled by means of the operating command. At least partial and advantageously full operation of the multimedia unit is particularly preferably possible by way of the household appliance operating unit. In particular in at least the operating state an operator operates the multimedia unit and/or the household appliance using the household appliance operating unit. It would be conceivable for the operating command to be for example a movement of a finger of the operator, which can be transmitted to the multimedia unit, it being possible for the multimedia unit to be operated and/or controlled preferably by means of the operating commend. The household appliance operating unit could function in the manner of a wireless mouse and/or touchpad mouse for operation of the multimedia unit.

It could also be possible for the household appliance operating unit to be operated by means of the multimedia unit. It could be possible for an interaction option relating to the multimedia unit, for example an active navigation, in particular selection for example of a digital medium, and/or control and/or manipulation of content, for example call acceptance and/or rejection and/or control of playback parameters, for example of a video and/or music, to be changed by means of the operating command. The operator could place a call and/or send an email and/or apply and/or change settings at the multimedia unit by means of the operating command, preferably during operation of the household appliance by means of the household appliance operating unit. It would also be conceivable for the operator to be able to change a setting of the household appliance operating unit and/or the household appliance by means of the multimedia unit and in particular to be able to perform and/or set and/or select operation of the household appliance operating unit and/or the household appliance by means of the operating command. The operator could possibly transfer the operating command from the household appliance operating unit to the multimedia unit based on voice input.

The household appliance operating unit advantageously comprises a recognition unit, which is provided to recognize a multimedia unit located in the area around the household appliance operating unit. The multimedia unit could possibly connect and/or be coupled automatically to the household appliance operating unit. Alternatively and/or additionally the operator could be alerted to the presence of the multimedia unit, in particular by means of the household appliance operating unit, and be prompted by the household appliance operating unit to couple and/or connect to the multimedia unit.

"Provided" here and in the following means specifically programmed, designed and/or equipped. That an object is provided for a specific function means that the object fulfils and/or executes said specific function in at least one application and/or operating state.

It would be conceivable for only the operating command, in particular a navigating finger movement of the operator, to be able to be transmitted from the household appliance operating unit to the multimedia unit by means of the communication unit. Screen content, in particular screen information, of the multimedia unit could only be displayed graphically on the multimedia unit, operation of the graphical display on the multimedia unit preferably being provided by means of the operating command which can be transmitted from the household appliance operating unit. The household appliance operating unit could be free of the graphical display of the screen content of the multimedia unit. The household appliance operating unit possibly comprises a navigation surface, in particular a touch surface, preferably a black touch surface, on which the operator could perform the navigating finger movement. The communication unit could transmit the navigating finger movement to the multimedia unit to operate and/or control the multimedia unit.

It is also proposed that at least one item of screen information can be transmitted from the multimedia unit to the household appliance operating unit by means of the communication unit. This further enhances convenience, in particular operating convenience, and efficiency, as at least one item of screen information can be supplied to an operator from a multimedia unit on a household appliance operating unit, it being possible for the operator to execute an action of the multimedia unit by way of the household appliance operating unit as a function thereof. In particular the operator can respond to the screen information and/or execute the action quickly and efficiently. It is also advantageously possible to transmit an entire screen interface from the multimedia unit to the household appliance operating unit, such that the operator can see a transmission of the entire screen of the multimedia unit on the household appliance operating unit.

The screen information is particularly preferably screen information of the multimedia unit, which can be transmitted to the communication unit by means of the further communication unit in particular in at least the operating state. Alternatively and/or additionally screen information could be transmitted from the household appliance operating unit, in particular the household appliance, to the further communication unit, in particular to the multimedia unit, by means of the communication unit. The screen information could include for example at least one appliance setting and/or information and/or objects, in particular apps, from a screen of the multimedia unit and/or the household appliance operating unit. In particular the screen information comprises at least the digital medium. It would be conceivable for example for it to be possible to transmit a video and/or a music selection and/or a photo and/or documents, in particular a text document, from the multimedia unit to the household appliance operating unit.

In particular the multimedia unit has a plurality of apps, which can be transmitted to the household appliance operating unit by means of the communication unit and/or the further communication unit in at least the operating state. It would also be conceivable for at least one app, in particular software that is compatible with the multimedia unit, to be stored in the household appliance operating unit. It could be possible to transmit a screen of the multimedia unit at least partially and preferably in its entirety to the household appliance operating unit by means of the communication unit and/or the further communication unit based on at least the screen information. The entire screen of the multimedia unit can preferably be displayed to the operator on the household appliance operating unit in at least the operating state. In particular screen information is transmitted from the multimedia unit to the household appliance operating unit in at least the operating state, advantageously while the operator operates the household appliance operating unit and/or operates the household appliance by means of the household appliance operating unit.

The screen information could comprise an individual function and/or information, for example a time and/or volume and/or battery status, in particular of the multimedia unit. In particular the operator could for example accept and/or reject an incoming call from the multimedia unit at the household appliance operating unit based on the transmission of screen information. Alternatively and/or additionally the operator could place a call and/or apply and/or change settings at the multimedia unit based on the screen information. The screen information could also comprise an incoming message, so that an operator could see and/or read said message on the household appliance operating unit. Alternatively and/or additionally the operator could advantageously also compose a message by way of the household appliance operating unit and send it by means of the multimedia unit. An action by the operator, in particular as a function of the screen information, advantageously the operating command, can be transmitted from the communication unit to the further communication unit. The screen information could change and/or be adjusted based on the operating command in at least the operating state.

It would be conceivable for it to be possible to display and/or output the screen information to the operator by means of an optical and/or acoustic display and/or output in at least the operating state, in particular by means of the household appliance operating unit.

To enhance convenience further it is proposed that the household appliance operating unit has a display, which is provided to display at least one item of household appliance operating information, in particular changing household appliance operating information, in at least one display region in at least one operating state. This allows at least one setting and/or an operating state of the household appliance to be displayed and/or conveyed to an operator in an advantageously convenient manner.

The display is preferably configured as a touch-sensitive display. The display could be an OLED display, in particular an AMOLED display, or a display with for example at least one backlight, in particular an LC display. In particular the display has a plurality of display elements, which could be configured for example in the manner of liquid crystal segments or LEDs, in particular OLEDs. The display elements advantageously comprise at least one material which is self-luminous, for example an electroluminescent material, which in particular emits light itself, when the display is in the operating state, in particular in at least the operating state. The display elements preferably form a TFT matrix. The display advantageously has a TFT interface, in particular a thin-film transistor.

It could be possible to insert the display for example into a cutout in the household appliance and/or the housing unit. Alternatively the display could be configured as a film and be able to be fixed, possibly by adhesion, to at least one surface of the household appliance and/or a surface of the housing unit. The display could be made for example at least partially and/or largely of a mineral, in particular a glass, and/or a metal and/or a metal alloy and/or a plastic and/or a material containing carbon and/or a composite material.

In at least the operating state the display displays at least one item of information, in particular changing information, in the display region. In particular in at least the operating state the information is available in the display region, it being possible in particular to activate and deactivate the display elements to display the information in the display region as a function of the information. The household appliance operating unit and/or the control unit could control and/or regulate the display in the display region. The display elements available for displaying the information can advantageously be activated or deactivated when the information is changed, for example by the operating command of the operator.

The display in the display region can show at least the screen information. The information is preferably the household appliance operating information. In particular the household appliance operating information is at least information relating to an operating state of the household appliance. The household appliance operating information could be for example a temperature of the household appliance, in particular a refrigeration temperature and/or a dishwashing temperature and/or a wash temperature and/or advantageously a cooking temperature, and/or a cleaning program, for example a dishwashing program and/or a wash program and/or a drying program. The household appliance operating information preferably comprises an, in particular set, heat output and/or an, in particular activated, heating zone and/or a distribution of heating zones on the hob, in particular for matrix hobs, and/or a cooking program, for example a recipe and/or at least a recipe step. The household appliance operating information could also supply at least one information item for selecting and/or setting and/or changing the operating state of the household appliance. In at least the operating state the operator could call up the household appliance operating information for display in the display region and/or apply settings for the display at least of the household appliance operating information in the display region.

It is proposed that at least one household appliance function can be set in the display region. This further enhances operator convenience, in particular in that it is not only possible to display household appliance operating information but also to set a household appliance function in a display region of a display.

The household appliance function could be for example an operating function for operating the household appliance, in particular the hob, it being possible for the operating function to be a cooking function and/or a main cooking function for example. The cooking function and/or main cooking function could be at least boiling, in particular at a temperature of preferably 120° C., and/or grilling and/or roasting and/or frying, in particular at a temperature of at least 230° C., particularly preferably at least 245° C., at least of the food being cooked. In particular it could be possible for the household appliance function to be controlled and/or set and/or regulated and/or selected by means of the household appliance operating unit, in particular the control unit. For example the operator could select and/or set a heat output level and/or a heating zone for heating food. Alternatively and/or additionally the household appliance function could be an on and/or off function for switching the household appliance on and/or off. In particular household appliance operating information that can be displayed in the display region is a function of the household appliance function, advantageously the set household appliance function, in particular a preset household appliance function or one set by the operator, in at least the operating state.

If the household appliance operating unit is at least partially configured as a hob operator interface, an operator can set a household appliance function, in particular an operating parameter and/or an operating function, for operating a household appliance, preferably a hob, by means of the hob operator interface. This further enhances convenience and/or efficiency, in particular cost efficiency, as the household appliance and also the multimedia unit can be operated and/or controlled at the same time by means of the operator interface, meaning there is no need for additional display surfaces and/or operating units.

In particular the household appliance function can be set in the display region by means of the hob operator interface. The operator interface, in particular the hob operator interface, is provided in particular for optical and/or acoustic and/or haptic communication between the operator and the household appliance operating unit and/or the control unit. In particular the operator interface is provided for inputting and/or selecting at least one operating parameter of the household appliance and/or the household appliance function. At least one operating parameter and/or the household appliance function could be for example a heat output and/or a heat output density and/or a heating zone. The operator interface could be provided to output and/or display at least one value at least of the operating parameter and/or the household appliance function to the operator by means of the display region. The display and/or at least the display region is advantageously part of the hob operator interface.

It would be conceivable for the display only to comprise the display region, in which only the household appliance operating information can be displayed and/or the household appliance function can be set in at least the operating state.

If the display is provided to display at least one information item, in particular a changing information item, relating to the multimedia unit in at least one further display region in at least one operating state, flexibility and/or convenience, in particular operating convenience, can advantageously be enhanced preferably in that different appliance information, in particular information about different appliances and/or units, for example household appliance operating information and information relating to the multimedia unit, can be displayed by means of just one display.

The operating state is preferably the operating state cited above. The further display region could comprise identical information to the display region, in particular at least the household appliance operating information. The information relating to the multimedia unit could comprise an individual function and/or information item, for example a time and/or volume and/or battery status and/or a message, from the multimedia unit.

At least the screen information can preferably be displayed in the further display region. This advantageously makes a display, relating to screen information from a multimedia unit, convenient and/or more efficient.

It would be conceivable for the operator to be able to control and/or set the optical and/or acoustic display of the display region and/or the further display region by means of the multimedia unit. To enhance convenience, particularly operating convenience, even further, it is proposed that at least one function of the multimedia unit can be set in the further display region. In particular the household appliance operating unit can function in the manner of a wireless mouse and/or touchpad mouse for operating the multimedia unit and an operator can set and/or select at least one function relating to the multimedia unit by means of the household appliance operating unit at least when a household appliance device and/or household appliance is in an operating state.

The function could be for example a setting relating to the screen information and/or an appliance function of the multimedia unit. A volume and/or brightness of the multimedia unit could also possibly be set. In particular the function relating to the multimedia unit can be set by means of the operating command.

The display region and/or further display region could for example be square or circular in shape. In particular the display region and/or the further display region are part of a first region of the display. It would be conceivable for the display region and the further display region to be arranged in the first region and advantageously both display information, in particular the household appliance operating information and/or the screen information, at the same time. The first region could cover and/or comprise an entire region of a display surface of the display. Alternatively the first region could comprise at least 40%, advantageously at least 50%, preferably at least 60% and in particular maximum 90%, particularly preferably maximum 70% of the display surface.

In one preferred configuration of the invention it is proposed that the household appliance device has a setting unit, which is provided to change a position and/or size of the display region and/or the further display region on the display. Such a configuration results in a household appliance device with further improved characteristics in terms of operating convenience. It allows any position and/or size of a display region and/or a further display region to be selected by way of a region, in particular a first region, of a display. This advantageously allows an optical display of information in the display region and/or the further display region to be set individually by an operator.

The shape and/or position and/or size of the display region and/or the further display region can preferably be adjusted by means of the setting unit. In at least the operating state the operator could use the setting unit to change the position and/or size of the display region. It would be conceivable for the change to the position of the display region to be a rotational movement of the display region on the display. The change to the position of the display region preferably comprises a translational movement of the display region on the display. In particular the change to the position of the display region differs from a simple change to a resolution of the display. When the size of the display region is changed, the display region could be compressed and/or extended, in particular reduced and/or enlarged. For example the operator could touch the display region and/or the further display region at an edge of the display region and/or further display region and drag it over the display in the manner of a conventional drag & drop action.

It would be conceivable for the setting unit to be part of a control unit of the household appliance device configured separately from the display. The setting unit is advantageously part of the display. The setting unit could have at least one operating means for changing the position and/or size of the display region manually. The operating means could be part of the household appliance operating unit, in particular the hob operator interface, and/or the display. In particular the operating means is part of the touch-sensitive display surface. The setting unit preferably converts setting commands from the operator, in particular by means of the operating means, directly to changes to the position and/or size of the display region; for example the setting commands could bring about a displacement of the display region in x and/or y direction by a length that is predefined and/or selected manually by the operator. The x and y directions are perpendicular directions, oriented parallel to the display surface when the display is mounted, an angle between the x direction and y direction being in particular maximum 5°, preferably maximum 2° and particularly advantageously maximum 1° from a right angle. The setting unit advantageously has two separately configured operating means for displacing the display region in an x direction and displacing the display region in a y direction.

To prevent an unauthorized or unintentional change to the position and/or size of the display region, the setting unit could be provided only to change the position and/or size of the display region after at least one successful authorization. Authorization could comprise for example the inputting of a password, the performance of a predefined authorization operation or communication with a specific external unit, for example a key transponder.

It is also proposed that the display region can be reduced and the further display region enlarged at the same time by means of the setting unit. This improves the individual setting and display of a display region and/or a further display region, thereby even further enhancing convenience, in particular operating convenience and/or flexibility. It also allows a display to be used efficiently with sufficient flexibility in respect of the position and/or size and/or shape of the display region and/or further display region. Also the position and/or size of the display region and/or further display region can be changed in an intuitive manner.

"At the same time" means in particular that when the position and/or size of the display region changes, the position and/or size of the further display region also changes simultaneously and/or at the same time and/or instantaneously. The setting and/or changing of the display region and/or further display region could take place within the first region. In particular the display region and the further display region together fill the first region in at least the operating state. If a display in the display region and/or the further display region changes, preferably in size and/or position, the display in the further display region and/or the display region also changes at the same time. Alternatively and/or additionally it could be possible to enlarge the display region and reduce the further display region at the same time. If the display in the display region changes by at least 3%, advantageously by at least 5%, preferably by at least 10%, the display in the further display region changes by at least 3%, advantageously by at least 5%, preferably by at least 10% at the same time.

A change to the display region and/or further display region preferably automatically brings about a temporal change to the further display region and/or the display region. In particular the display region and/or the further display region can be changed by a swiping movement and/or a sliding movement by means of the operating means on the display, advantageously being displaced in the manner of a conventional drop & drag action on the display. The setting unit could comprise a control unit, for example a processor, receive setting commands from the operating means to display the display region and/or the further display region and advantageously change and/or control the display on the display based on the setting commands.

Alternatively it would also be conceivable for the display region or the further display region only to be able to be displayed in the first region. In order to enhance convenience and/or flexibility further, it is proposed that the household appliance device has a switching unit, which can be used to switch between a display of the display region and a display of the further display region. This makes a larger region available to an operator for displaying a display region and/or a further display region. The display displayed for the operator can advantageously be improved, in particular when displaying digital media, for example a video and/or a photo.

It would be conceivable for the switching unit to be part of a control unit of the household appliance device configured separately from the display. The switching unit is advantageously part of the display. The switching unit could be used to change the color setting of a display of the display region and/or further display region. In particular a region displayed on the display in at least the operating state, in particular the display region and/or the further display region, is displayed in color. When switching from the display region or the further display region to a display of the further display region or the display region, the switching unit could change the color setting so that the region, in particular the display region or the further display region, that can be currently displayed on the display, advantageously in the first region, is in color and the respective region not currently displayed, in particular the display region or the further display region, can be displayed in black and white, in particular in grayscale.

Switching between the display region and the further display region could take place based on a specific, in particular defined, finger movement, for example a finger movement from one corner of the display to a further corner of the display opposite said corner, and/or a swiping movement and/or multiple tapping and/or pressing on the part of the operator, in particular a double click, on the display. For example the operator could touch the display region or the further display region at an edge of the display region and drag it over the display in the manner of a conventional drag & drop action, until the further display region or the display region is visible.

The display could comprise a second region. The display region and/or the further display region could be part of the second region of the display. It would be conceivable for the first region and the second region to each display an information item and/or a function and/or a setting at the same time. The second region could cover and/or comprise an entire region of the display surface of the display. Alternatively the second region could comprise at least 10%, advantageously at least 20%, preferably at least 30% and in particular maximum 60%, particularly preferably maximum 50% of the display surface. In particular the first region and second region are arranged next to one another on the display and together advantageously fill the entire display surface. An on and/or off function for switching the household appliance on and/or off could be displayed, advantageously continuously, for example in the second region.

The switching unit preferably has an operating element, which is displayed continuously by the display in a least one operating state. This allows an operator to switch in a convenient and more flexible manner, in particular at any time, in at least one operating state between a display of a display region and a display of a further display region, advantageously regardless of whether the display region or the further display region is displayed on the display.

The operating state is in particular the operating state cited above. The operating element could be part of the operator interface and/or the display. It would also be conceivable for the display to have its own operating elements and/or operating means, which are held by a display housing, in particular pressure switches or touch-sensitive switches for activating the setting unit and/or switching unit. The operating element is preferably part of the touch-sensitive display surface. In particular in at least the operating state the operating element comprises at least one symbol, which indicates whether a display of the display region or the further display region is present or to which display the operator could switch. For example in the case of a display of the display region, in particular with at least the household appliance operating information, the operating element could comprise an arrow symbol, which shows the operator that when the operating element is operated the display can be switched to the further display region, in particular with the information relating to the multimedia unit. Alternatively and/or additionally the operating element could comprise a cooking symbol, when the display displays the further display region in at least the operating state.

It would be conceivable, when the recognition unit recognizes the multimedia unit in the surrounding area, for the operating element to indicate to the operator that a display of the further display region is available, in particular in the first region of the display.

The invention also relates to a method for operating a household appliance device, in particular according to one of the above embodiments, with a household appliance operating unit, at least one operating command being transmitted from the household appliance operating unit for communication with at least one external multimedia unit. Such a method allows operation of a household appliance device with improved characteristics in terms of convenience, in particular operating convenience.

The household appliance device here should not be restricted to the application and embodiment described above. In particular the household appliance device can have a number of individual elements, parts and units that is different from the number cited herein to fulfil a mode of operation described herein.

BRIEF DESCRIPTION OF THE DRAWINGS

Further advantages will emerge from the description of the drawings that follows. The drawings show an exemplary embodiment of the invention. The drawings, description and claims contain numerous features in combination. The person skilled in the art will expediently also consider the features individually and combine them in useful further combinations.

DETAILED DESCRIPTION OF EXEMPLARY EMBODIMENTS OF THE PRESENT INVENTION

Figure 1:
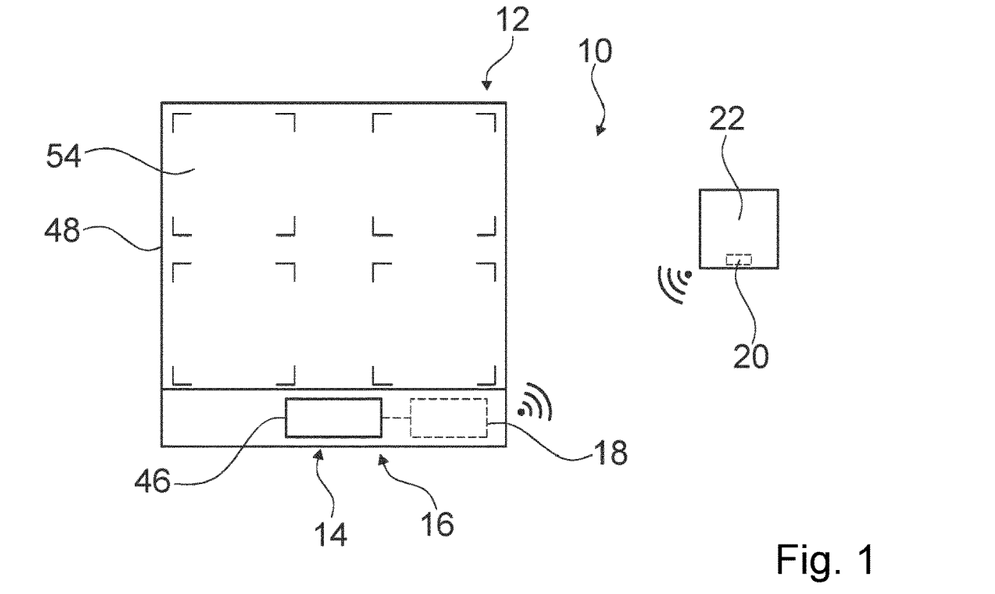
FIG. 1 shows a household appliance system with a household appliance device configured as a hob device and an external multimedia unit.

FIG. 1 shows a household appliance system 10. The household appliance system 10 here comprises a household appliance 12 configured as a hob. The household appliance 12 could alternatively also be configured as an oven, microwave, refrigerator, freezer, dishwasher, washing machine and/or tumble dryer. The household appliance 12 comprises a household appliance device 14 for communicating with an external multimedia unit 22 of the household appliance system 10.

The household appliance device 14 configured here as a hob device has a household appliance operating unit 16. The household appliance operating unit 16 is provided to operate and/or control and/or regulate the household appliance 12 and/or the household appliance device 14. The household appliance operating unit 16 here comprises a recognition unit, which is provided to recognize a multimedia unit 22 in the area around the household appliance operating unit 16, the household appliance operating unit 16 being able to connect and/or be coupled (not shown) automatically to the multimedia unit 22.

Figure 2:
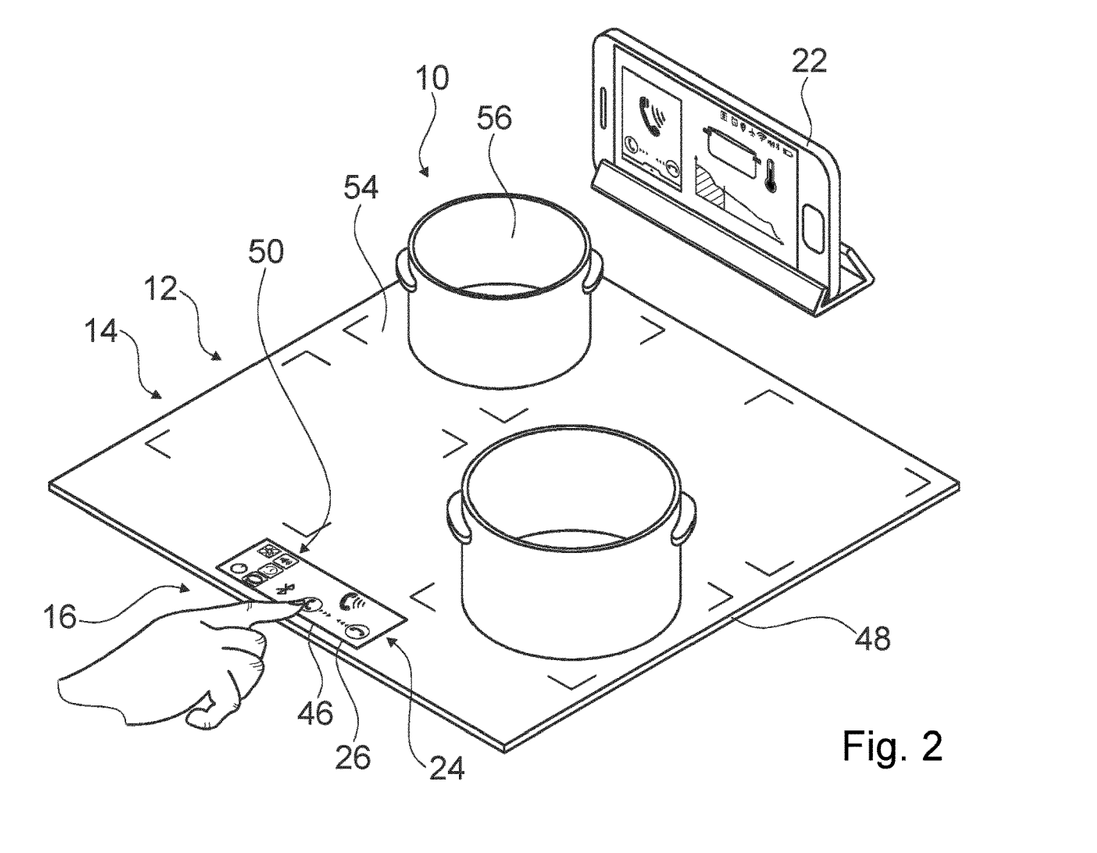
FIG. 2 shows a household appliance unit of the household appliance device configured as a hob operator interface and communicating with the external multimedia unit.

FIGS. 1 and 2 show that the household appliance operating unit 16 is configured at least partially as a hob operator interface 46. In this exemplary embodiment the household appliance 12 has a placement plate 48 provided as a hob plate. It can be seen from FIG. 2 that the placement plate 48 here has four heating zones 54, with a cooking utensil 56 being arranged by way of example in two of the heating zones 54. For clarity only one heating zone 54 and one cooking utensil 56 are shown with a reference character. In at least one operating state the hob operator interface 46 is provided to operate the household appliance 12 configured as a hob, specifically to heat a food to be cooked and/or the cooking utensil 56 in at least the heating zone 54.

To communicate with at least the multimedia unit 22 the household appliance operating unit 16 comprises a communication unit 18. The communication unit 18 is provided for a data transfer and/or data communication with the multimedia unit 22. The communication unit 18 has a transmit unit and/or a receive unit, which is/are configured to transmit and/or receive for example microwaves and/or infrared signals. It can be seen from FIG. 1 here that the multimedia unit 22 comprises a further communication unit 20, which is provided to communicate and/or exchange data with the communication unit 18 in at least the operating state. The further communication unit 20 has a further transmitter corresponding to the receiver and/or a further receiver corresponding to the transmitter for microwaves present. In a least the operating state at least one operating command can be transmitted from the household appliance operating unit 16 to the multimedia unit 22 by means of the communication unit 18. An operating command could also be transmitted from the multimedia unit 22 to the household appliance operating unit 16. Operation and/or control of the multimedia unit 22 and/or the household appliance 12 can be achieved by means of the operating command. In at least the operating state the household appliance operating unit 16 here allows an operator to interact with the multimedia unit 22 by means of the operating command and to control and/or regulate the multimedia unit 22 externally, by way of the household appliance operating unit 16. The household appliance operating unit 16 here functions in the manner of a wireless mouse and/or touchpad mouse for the operation and/or control of the multimedia unit 22.

The communication unit 18 is provided to transmit at least one item of screen information 24 from the multimedia unit 22 to the household appliance operating unit 16. It could also be possible to transmit screen information 24 from the household appliance operating unit 16 to the multimedia unit 22. Alternatively the screen information 24 could also only be located on the external multimedia unit 22 and the operating command, for example a navigating finger movement of the operator, could preferably be transmitted from the household appliance operating unit 16 to the external multimedia unit 22. The screen information 24 displayed on the household appliance operating unit 16 is shown here by way of example in the form of apps 50 and an incoming call of the multimedia unit 22 (see FIG. 2). Alternatively and/or additionally digital media, for example a video and/or a music list and/or images and/or documents, from the multimedia unit 22 could also be displayed on the household appliance operating unit 16. In the event of an incoming call, as shown in this exemplary embodiment in FIG. 2, information about the incoming call is transmitted from the multimedia unit 22 to the household appliance operating unit 16 based on the screen information 24. The operating command allows the operator to respond to the call, for example to accept or reject the call, by way of the household appliance operating unit 16. An action by the operator, specifically the operating command, can be transmitted from the communication unit 18 to the further communication unit 20. The screen information 24 of the multimedia unit 22 changes based on the operating command.

To improve a display of information, for example from the household appliance 12 and/or the multimedia unit 22, by means of the household appliance operating unit 16, the household appliance operating unit 16 comprises a display 26. The display 26 here is configured as a touch-sensitive display 26. As shown in FIG. 2, at least the screen information 24 can be transmitted to the display 26 in at least the operating state. The operator controls and/or regulates the multimedia unit 22 by way of the display 26 by means of the operating command.

Figure 3:
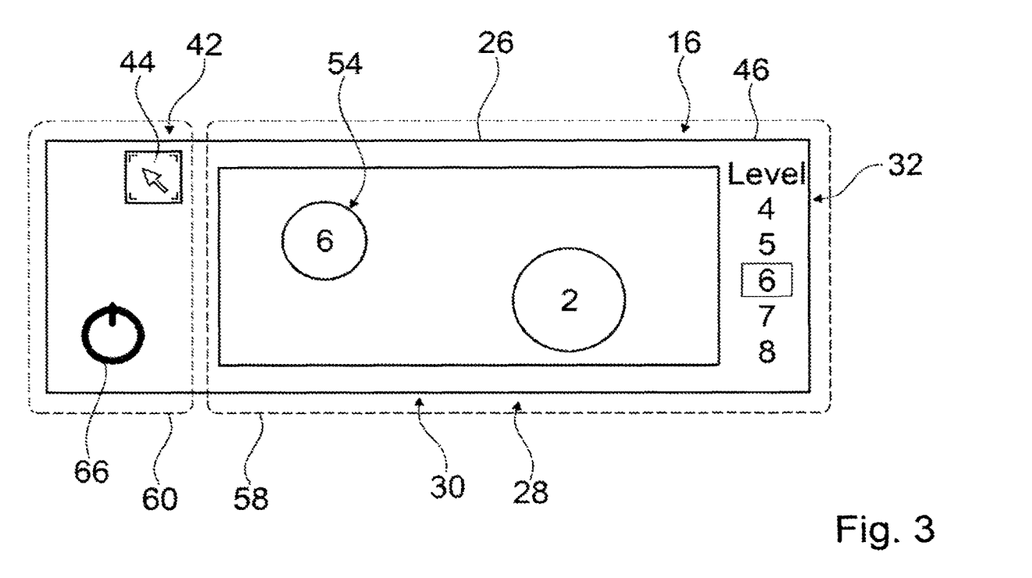
FIG. 3 shows a detailed view of a display of the household appliance unit, displaying household appliance operating information in a display region.
Figure 4:
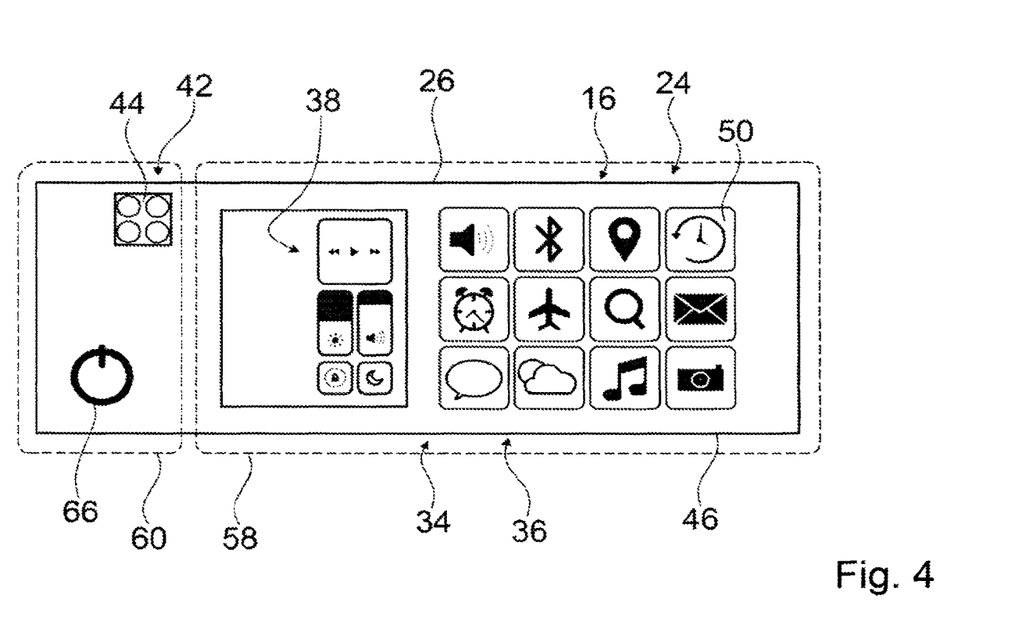
FIG. 4 shows a further detailed view of the display, displaying information relating to the multimedia unit in a further display region.
Figure 5:
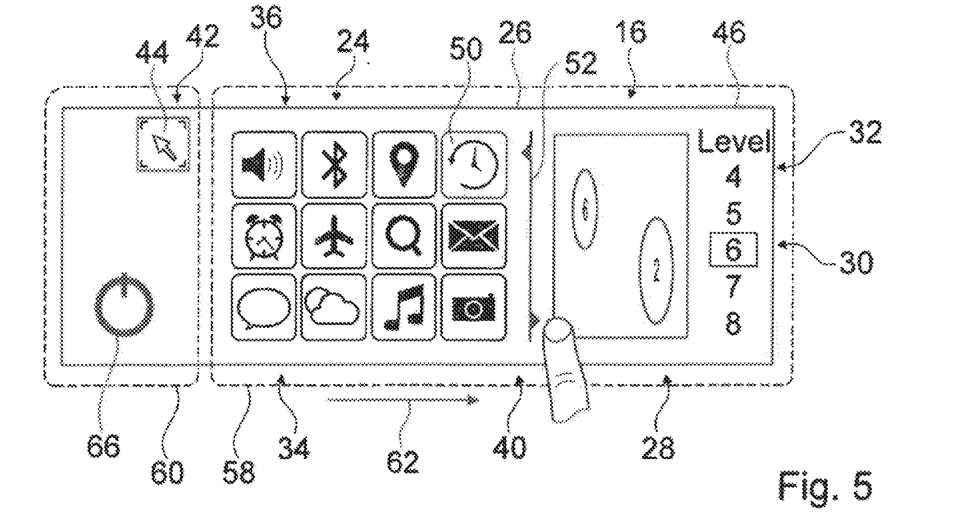
FIG. 5 shows a close-up view of the display region and the further display region in a first relative position.
Figure 6:
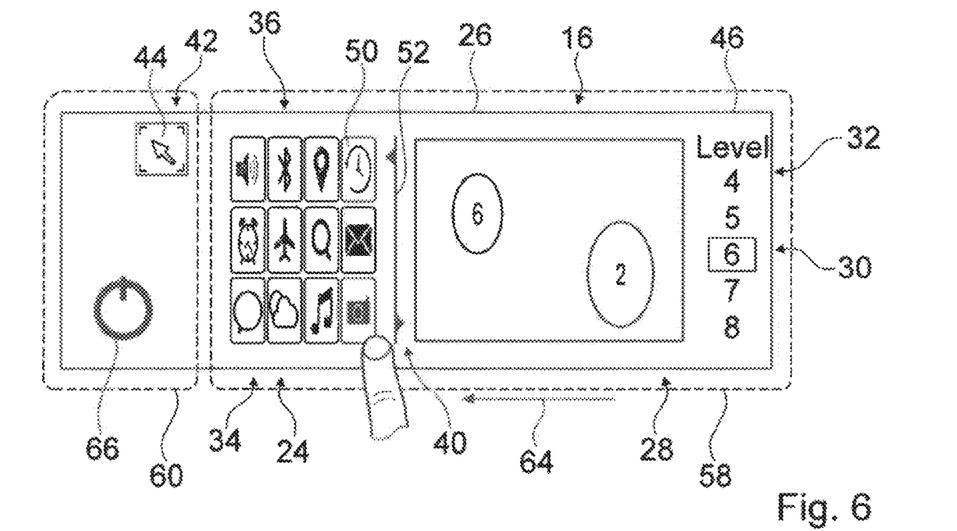
FIG. 6 shows a further close-up view of the display region and the further display region in a second relative position and FIG. 7 shows a schematically illustrated method for operating the household appliance device.

The following FIGS. 3 to 6 all show detailed views of the display 26. While FIG. 3 shows a view of a display region 28 of the display 26, an exemplary embodiment of a display of a further display region 34 of the display 26 can be seen in FIG. 4. FIGS. 5 and 6 also show that both the display region 28 and the further display region 34 can be displayed on the display 26 at the same time.

The display 26 has a first region 58. The display region 28 here is in the first region 58 in at least the operating state. The display 26 is provided to display at least household appliance operating information 30 (see FIG. 3) in at least the display region 28 in at least the operating state. At least one household appliance function 32 can be set in the display region 28. The household appliance function 32 is an operating function for operating the household appliance 12, it being possible to set at least one operating parameter of the household appliance 12 in the display region 28. In at least the operating state the household appliance function 32 can be set and/or selected by means of the household appliance operating unit 16. In this exemplary embodiment the household appliance function 32 comprises a selection of a heat output level and a selection of the heating zone 54. The display region 28 displays a current selection of at least one heating zone 54 and allows the operator to select an associated heat output density by way of the touch-sensitive display 26.

The display 26 has a second region 60. An on/off function 66 of the household appliance device 14 is displayed continuously (see FIGS. 3 to 6) in the second region 60 here.

In at least the operating state and in the further display region 34 the display 26 is provided to display at least one item of information 36 relating to the multimedia unit 22 (see FIG. 4). The further display region 34 is part of the first region 58. The information 36 relating to the multimedia unit 22 here is the screen information 24 cited above, so that the screen information 24 can be displayed in the further display region 34. In this embodiment at least one function 38 of the multimedia unit 22 can be set in the further display region 34. The function 28 is an appliance function and/or operating function of the multimedia unit 22. It is for example a volume and/or a brightness and/or a music setting.

The household appliance device 14 has a switching unit 42, which can be used to switch (see FIGS. 3 and 4) between a display of the display region 28 and a display of the further display region 34. For more convenient and/or faster switching between the display region 28 and/or the further display region 34 the switching unit 42 has an operating element 44, which is displayed continuously by the display 26 in at least the operating state. The operating element 44 is part of the second region 60 and is continuously displayed in the second region 60. Alternatively and/or additionally the operator could switch between the display of the display region 28 and the display of the further display region 34 based on a specific finger movement and/or a swiping movement and/or multiple tapping on the display 26. FIG. 3 here shows that when the display region 28 is displayed in the first region 58, the operating element 44 comprises an arrow symbol for example, so that the operator can see that it is possible to switch from the display region 28 to the further display region 34 by means of the operating element 44. If the further display region 34 is displayed in the first region 58 on the display, the operating element 44 comprises for example a hob symbol (see FIG. 4). This shows an operator that it is possible to switch to the display region 28 by operating the operating element 44.

The household appliance device 14 has a setting unit 40, which is provided to change a position and/or size of the display region 28 and/or the further display region 34 on the display 26 (see FIGS. 5 and 6). The setting unit 40 here is part of the touch-sensitive display 26. The setting unit 40 has an operating means 52. The operating means 52 is used to set and change a size and/or position of the display region 28 and the further display region 34 manually. The display region 28 and the further display region 34 can be changed by a swiping movement and/or a sliding movement of the operating means 52 on the display, it being possible for a translational displacement of the display region 28 and the further display region 34, in this instance in the x direction, to be brought about by means of the operating means 52. Alternatively it could also be possible to displace the display region 28 and the further display region 34 in the manner of a conventional drag & drop action on the display 26. Alternatively the household appliance device 14 could also comprise additional operating elements for displacing the display region 28 and the further display region 34 in the x and/or y direction (not shown).

FIG. 5 shows that the display region 28 can be reduced and the further display region 34 can be enlarged at the same time by means of the setting unit 40. The operator here displaces the operating means 52 in a first direction 62 to enlarge the further display region 34 on the display 26. FIG. 6 shows the reverse procedure, where the operator displaces the operating means 52 in a second direction 64 to enlarge the display region 28 on the display 26. FIGS. 5 and 6 both show that a change to the display region 28 and/or the further display region 34 always brings about a change to the further display region 34 and/or the display region 28 at the same time.

Figure 7:
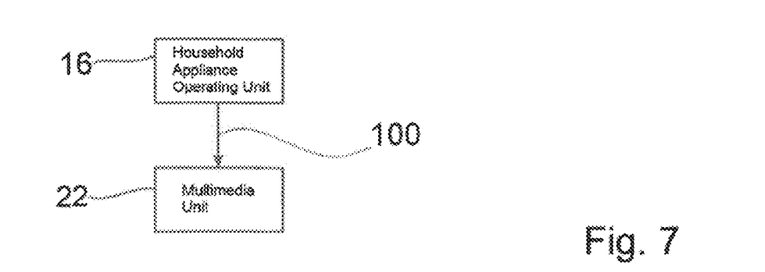

FIG. 7 shows a schematically illustrated flow diagram of a method for operating the household appliance device 14. In one method step 100, to communicate with at least the multimedia unit 22, at least the operating command is transmitted from the household appliance operating unit 16, such that the multimedia unit 22 is operated and/or controlled by means of the operating command.

The invention claimed is:

1. A hob system, comprising:
an external multimedia unit; and
a hob comprising:
a first display region configured to display information based on a selected one of a plurality of modes;
a second display region configured to continuously display a hob on/off selector and a first operation element when in an operating state, wherein selection of the first operation element switches the display of the first display region between a first mode and a second mode of the plurality of modes; and
a hob operating unit configured to:
transmit an operating command to the multimedia unit,
in the first mode, display and control only hob operating information in the first display region, wherein the hob operating information comprises a heat output level and a heating zone selection,
in the second mode, display and control only multimedia unit information in the first display region, and
in a third mode, display and control a second operation element, the hob operating information, and the multimedia unit information in the first display region, wherein translation of the second operation element simultaneously controls size and position of each of the hob operating information and the multimedia unit information in the first display region.

2. The hob system of claim 1, wherein the hob is further configured to receive an item of screen information from the multimedia unit.

3. The hob system of claim 1, wherein the hob is a hob operator interface.

4. A hob system, comprising:
an external multimedia unit; and
a hob household appliance device comprising:

a first display region configured to display information based on a selected one of a plurality of modes;

a second display region which continuously displays a hob on/off selector and a first operation element when in an operating state, wherein selection of the first operation element switches the display of the first display region between a first mode and a second mode of the plurality of modes;

a hob operating unit configured to:
transmit an operating command to the multimedia unit via a communication unit, in the first mode, display and control only hob operating information in the first display region, wherein the hob operating information comprises a heat output level and a heating zone selection, in the second mode, display and control only multimedia unit information in the first display region, and in a third mode, display and control a second operation element, the hob operating information, and the multimedia unit information in the first display region, wherein translation of the second operation element simultaneously controls size and position of each of the hob operating information and the multimedia unit information in the first display region, wherein the external multimedia unit comprises a further communication unit configured to communicate with the communication unit.

5. A method for operating a hob system, the method comprising:
transmitting an operating command from a hob of the hob for communication with an external multimedia unit;

displaying mode-based information in a first display region of the hob;

continuously displaying a hob on/off selector and a first operation element in a second display region of the hob when in an operating state, wherein selection of the first operation element switches the display of the first display region between a first mode and a second mode;

in the first mode, displaying and controlling only hob operating information in the first display region, wherein the hob operating information comprises a heat output level and a heating zone selection;

in the second mode, displaying and controlling only multimedia unit information in the first display region; and in a third mode, displaying and controlling a second operation element, the hob operating information, and the multimedia unit information in the first display region, wherein translation of the second operation element simultaneously controls size and position of each of the hob operating information and the multimedia unit information in the first display region.

6. The method of claim 5, further comprising transmitting an item of screen information from the multimedia unit to the hob.

7. The hob system of claim 4, wherein the second operation element comprises a separation of the hob operating information and the multimedia unit information, and the separation is translated to reduce a size of one of the hob operating information and the multimedia unit information while enlarging the size of the other of the hob operating information and the multimedia unit information.

8. The hob system of claim 4, wherein translation of the second operation element comprises a selection one of the hob operating information and the multimedia unit information and moving the selection in place of the other of the hob operating information and the multimedia unit information.

* * * * *